(12) United States Patent
Williams et al.

(10) Patent No.: US 11,884,807 B2
(45) Date of Patent: Jan. 30, 2024

(54) PROCESS AND APPARATUS FOR MANUFACTURE OF PROCESSABLE POLYVINYL ALCOHOL

(71) Applicant: Aquapak IP Limited, Birmingham (GB)

(72) Inventors: John Williams, Chirbury (GB); Sian Griffiths, Glan Conwy (GB); Robert Ashworth, Colwyn Bay (GB)

(73) Assignee: Aquapak IP Limited, Birmingham (GB)

( * ) Notice: Subject to any disclaimer, the term of this patent is extended or adjusted under 35 U.S.C. 154(b) by 0 days.

(21) Appl. No.: 17/368,176

(22) Filed: Jul. 6, 2021

(65) Prior Publication Data

US 2022/0002532 A1    Jan. 6, 2022

(30) Foreign Application Priority Data

Jul. 6, 2020   (EP) .................................... 20184345

(51) Int. Cl.
| | |
|---|---|
| C08L 29/04 | (2006.01) |
| C08F 116/06 | (2006.01) |
| C08J 3/05 | (2006.01) |
| C08K 5/098 | (2006.01) |

(52) U.S. Cl.
CPC .............. *C08L 29/04* (2013.01); *C08F 116/06* (2013.01); *C08J 3/05* (2013.01); *C08K 5/098* (2013.01); *C08K 2201/014* (2013.01); *C08L 2201/50* (2013.01)

(58) Field of Classification Search
CPC ..................................... C08L 29/04; C08J 3/05
See application file for complete search history.

(56) References Cited

U.S. PATENT DOCUMENTS

| | | | |
|---|---|---|---|
| 3,607,812 A | 9/1971 | Takigawa et al. | |
| 2005/0001348 A1 | 1/2005 | Kohnen et al. | |
| 2017/0081442 A1* | 3/2017 | Johnson | B01J 19/2415 |
| 2017/0247154 A1 | 8/2017 | Ieda et al. | |
| 2022/0002532 A1 | 1/2022 | Williams et al. | |

FOREIGN PATENT DOCUMENTS

| | | | |
|---|---|---|---|
| CN | 101864132 A | 10/2010 | |
| CN | 102234405 A | 11/2011 | |
| CN | 104073000 A | 10/2014 | |
| CN | 109181186 A | 1/2019 | |
| WO | 9722658 A1 | 6/1997 | |
| WO | WO-9954400 A1 * | 10/1999 | B32B 27/32 |
| WO | 2017/046361 A1 | 3/2017 | |

OTHER PUBLICATIONS

Zhifeng et al., "Effects of the Molecular Structure of Polyvinylalcohol on the Adhesion to Fibre Substrates", Fibres and Textiles in Eastern Europe, vol. 15, No. 1, Mar. 2007. (82-85 pages).

* cited by examiner

*Primary Examiner* — Wenwen Cai
(74) *Attorney, Agent, or Firm* — Young Basile Hanlon & MacFarlane, P.C.

(57) ABSTRACT

The invention describes a method for the manufacture of a plasticized polyvinyl alcohol polymer mixture including the steps of: introducing into a mixing reactor a polyvinyl alcohol polymer comprising homopolymeric polyvinyl alcohol or a blend thereof having a degree of hydrolysis in the range of 93% to less than 98% or more; where the plasticizer comprises two or more compounds selected from the group consisting of diglycerol, triglycerol, xylose, D-mannitol, triacetin, dipentaerythritol, 1,4-butanediol, 3,3-dimethyl-1, 2-butanediol, and caprolactam; reacting the water, the plasticizer and the polyvinyl alcohol polymer in the reaction zone to form the plasticized polymer; and allowing the plasticized polyvinyl alcohol polymer to pass from the primary outlet.

14 Claims, 3 Drawing Sheets

PROCESS AND APPARATUS FOR MANUFACTURE OF PROCESSABLE POLYVINYL ALCOHOL

CROSS-REFERENCE TO RELATED APPLICATION(S)

This application claims priority to European Application Patent Serial No. 20184345.5, filed Jul. 6, 2020, the entire disclosure of which is hereby incorporated by reference.

TECHNICAL FIELD

This invention relates to a process for manufacture of polyhydric polymers, particularly polyvinyl alcohol. The invention also relates to apparatus for use in carrying out the method. The invention further relates particularly but not exclusively to a method of manufacture of polyvinyl alcohol in a suitable physical form for processing into film or other extruded products. The invention further relates to a novel processable polyvinyl alcohol composition which may be made using the process.

BACKGROUND

Polyvinyl alcohol is commonly made by hydrolysis of polyvinyl acetate. The degree of hydrolysis affects the properties of the polymer. Polyvinyl alcohol having a low degree (LD) of hydrolysis, below 84%, is widely used in industry. Vinyl acetate copolymers, for example, with ethyl acetate have been used to make vinyl alcohol co-polymers which are easier to process. However, these co-polymers lack the advantageous physical properties of homopolymer polyvinyl alcohol, particularly highly hydrolyzed polyvinyl alcohol homopolymer. The present invention relates particularly to polyvinyl alcohol made by hydrolysis of homopolymeric polyvinyl acetate.

Highly hydrolyzed polyvinyl acetate, that is with a degree of hydrolysis greater than 93%, for example, 98% or higher, is a polymer which essentially comprises homo-polyvinyl alcohol. This polymer, similar to many carbohydrates, decomposes before its melting point of about 250° C. is reached. This makes melt processing difficult and for this reason, highly hydrolyzed polyvinyl alcohol has been processed as an aqueous solution. Partially hydrolyzed polyvinyl acetate is readily melt processed. For example, 80% hydrolyzed polyvinyl acetate, can be readily extruded or converted into film by blow molding.

The significant difference between highly hydrolyzed (high degree of hydrolysis, HD) and partially hydrolyzed (low degree of hydrolysis, LD) polyvinyl alcohols is the extent and quality of the crystalline order due to the differences in the chain structures. Polyvinyl alcohols with less than 2% non-hydrolyzed acetate groups can readily crystallize to form strongly hydrogen bonded crystalline domains. These crystalline domains have a structure which is essentially the same as found in polyethylene. The reason for this may be attributed to the small size of the hydroxyl group. However, because of the hydrogen bonding, the melting point of highly hydrolyzed polyvinyl alcohol is about 150° C. higher than that of polyethylene. Polyols have been used as plasticizers, but efficient manufacture of plasticized polyvinyl alcohol with a high degree of hydrolysis has been difficult to achieve.

WO2017/046361 discloses a method for manufacture of a plasticized polyvinyl alcohol having a degree of hydrolysis of 98 wt % or higher.

DETAILED DESCRIPTION

Figure 1:
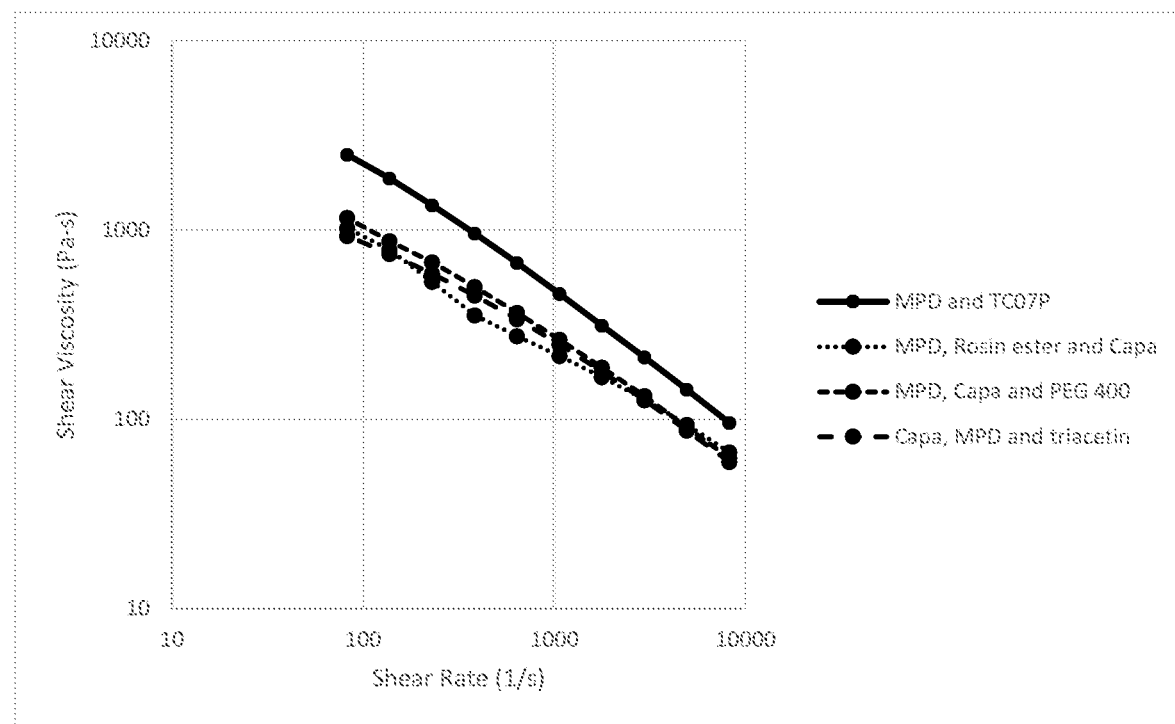
FIG. 1 illustrates the shear rate of MPD and TCO7P, MPD, rosin esters and Capa, MPD, Capa and PEG 400 and Capa, MPD and triacetin.

According to a first aspect of the present invention, there is provided a method for the manufacture of a plasticized polyvinyl alcohol polymer mixture, the method comprising the steps of:

introducing into a mixing reactor a polyvinyl alcohol polymer comprising homopolymeric polyvinyl alcohol or a blend thereof having a degree of hydrolysis in the range of 93 wt % to 98 wt % or more;

wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;

one or more secondary inlets located downstream from the primary inlet for introducing reactants comprising a processing aid and a plasticizer to the chamber to form a reaction mixture;

wherein the plasticizer is selected from the group consisting of the following compounds and mixtures thereof:
  (a) sugar alcohols selected from the group consisting of: diglycerol, triglycerol, fructose, ribose, xylose, D-mannitol, triacetin, and mixtures thereof; polyols selected from the group consisting of: pentaerythritol, dipentaerythritol, and mixtures thereof;
  (b) diols selected from the group consisting of: methyl pentanediol, 1,2-propanediol, 1,4-butanediol, 2-hydroxy-1,3-propanediol, 3-methyl-1,3-butanediol, 3,3-dimethyl-1,2-butanediol, and mixtures thereof;
  (c) glycols selected from the group consisting of: polyethylene glycol 300, polyethylene glycol 400, alkoxylated polyethylene glycol, and mixtures thereof;
  (d) caprolactam, tricyclic trimethylolpropane formal, rosin esters, euricamide, and mixtures thereof;

wherein the blending chamber comprises a plurality of heated regions arranged so that the mixture is subjected to a temperature profile whereby the temperature increases from the inlet to the outlet;

a secondary outlet located between the reaction zone and primary outlet arranged to allow removal of processing aid from the chamber;

reacting the processing agent, plasticizer and polymer in the reaction zone to form plasticized polymer; and allowing the plasticized polymer to pass from the primary outlet.

Use of a reactive mixing apparatus, typically an extruder in accordance with this invention allows the processing aid and plasticizer to be reacted with the polyvinyl alcohol or blend thereof, without decomposition of the polymer followed by removal of all or most of the processing aid from the secondary outlet to give plasticized polyvinyl alcohol or a blend thereof.

Use of homopolymeric polyvinyl alcohol with a high degree of hydrolysis is particularly advantageous. Homopolymeric polyvinyl alcohol is manufactured by hydrolysis of homopolymeric polyvinyl acetate, the degree of hydrolysis being 93 wt % or more in embodiments of this invention. Polyvinyl alcohol co-polymers made by hydrolysis of polyvinyl acetate co-polymers have inferior properties compared to homopolymeric polyvinyl alcohol. Homopolymeric polyvinyl alcohol may exhibit the following advantageous properties:

Polyvinyl alcohol polymers of this invention may have excellent film-forming, emulsifying and adhesive properties. The polymers may also have excellent barrier properties with resistance to oil, grease and solvents. The polymers may also exhibit high tensile strength and flexibility, as well as high oxygen and aroma barrier properties.

The polyvinyl alcohol polymer may comprise polyvinyl alcohol or a blend thereof wherein the polyvinyl alcohol polymer has a degree of hydrolysis of 93 wt % to 98 wt %, alternatively 93 wt % to less than 98 wt %, alternatively 93 wt % to 97 wt %, alternatively 93 wt % to 95 wt %.

The polyvinyl alcohol may be manufactured by hydrolysis of polyvinyl acetate, wherein the extent of hydrolysis is in the range from 93 wt % up to 98 wt %, alternatively 93 wt % to less than 98 wt %, alternatively 93 wt % to 97 wt %, alternatively 93 wt % to 95 wt %.

A blend of two or more polyvinyl alcohol polymers may be employed, for example a blend of two polyvinyl alcohol polymers with a high molecular weight and a low molecular weight respectively. A blend of polyvinyl alcohols with different hydrolysis levels can be combined. Blending different polyvinyl grades together enables the properties of the resultant polymer to be enhanced, for example, viscosity, solubility and melt strength.

A blend of two polyvinyl alcohol polymers having the same degree of hydrolysis but with different viscosities may be employed. For example, one polymer may have a viscosity of 5 cp and the other may have a viscosity of 28 cp in order to provide a polymer with a specific desired viscosity. The viscosity may be adjusted by changing the ratio of lower viscosity polymer to higher viscosity polymer. In an embodiment, a blend where the ratio of higher viscosity to lower viscosity polyvinyl alcohols is 80:20 wt % the resultant polymer may be more viscous than a blend with a 40:60 wt % ratio. This enables properties of the polymer to be controlled for use in specific applications. Controlling combinations with different degrees of hydrolysis and ratios of relative weights of the polymers allows consequent control of the solubility of the polymer. For example, two polymers with the same plasticizers, one with a blend of polyvinyl alcohol with a degree of hydrolysis greater than 98% may have a dissolution temperature of 70° C. in water, whereas the blend of polyvinyl alcohol with a degree of hydrolysis of 87-96% may have a dissolution temperature of 40° C. in water. A blend of the same polyvinyl alcohols in a ratio of 80:20 wt % may be soluble in water at 40° C., whereas with a ratio of 60:40 wt %, the dissolution temperature may be 30° C. This is illustrated in the table below:

| Polyvinyl alcohol (PVOH) blends | | | | |
|---|---|---|---|---|
| >98% hydrolysis, high viscosity PVOH | >98% hydrolysis, low viscosity PVOH | 85-96% hydrolysis, high viscosity PVOH | 85-96% hydrolysis, high viscosity PVOH | Solubility Temperature ° C. |
| 75% | 25% | | | 70 |
| | | 60% | 40% | 30 |
| | | 80% | 20% | 40 |

Melt strength may be improved by increasing the ratio of higher molecular weight to lower molecular weight polyvinyl alcohols in a blend.

In embodiments, the polyvinyl alcohol consists of a blend of two or more polyvinyl alcohol polymers each having a degree of hydrolysis of 93% to 98%, preferably one with a high molecular weight and at least one low molecular weight polyvinyl alcohol. In a preferred embodiment, the polymer comprises 80 wt % high molecular weight polyvinyl alcohol and 20 wt % low molecular weight polyvinyl alcohol. The ratio of high to low molecular weight molecular polyvinyl alcohol may be about 2:1 to about 10:1, preferably about 3:1 to about 7:1, more preferably about 6:1 to about 4:1, most preferably about 5:1.

The high molecular weight polymer may have a molecular weight of 60,000 to 120,000.

The lower molecular weight polymer may have a molecular weight of 5,000 to 30,000.

The blends of different molecular weight polymers employed may be selected in accordance with the physical properties required in the finished product. Use of more than two different molecular weight polymers may be advantageous. The use of a single molecular weight polymer is not precluded.

Selection of a plasticizer in accordance with the present invention allows use of blends of a desired viscosity without a loss of other properties. Alternatively, use of a blend may permit use of polyvinyl alcohol with one or more stabilizers while maintaining viscosity or other properties to permit manufacture of pellets, films or fibres or for other specific applications.

The processing aid is preferably water. Alternatively, the processing aid may comprise a mixture of water and one or more hydroxyl compound with a boiling point less than the boiling point or melting point of the plasticizer. Use of water is preferred for cost and environmental reasons.

In a first embodiment, two or more of the following plasticizer may be used in combination: dipentaerythritol, methyl pentanediol, triacetin, 2-hydroxy-1,3 propanediol, 3,3-dimethyl 1,2-butanediol, tricyclic trimethylol propane formal, D-mannitol, triglycerol and xylose.

Preferably a binary composition of the plasticizer of the first embodiment is employed.

The amount of each plasticizer used may be from about 2 wt % to about 15 wt % wherein the total amount of plasticizer in the formulation is from about 15 wt % to about 30 wt %.

In a second embodiment, the following plasticizers are used alone or in combination with each other or with one or more plasticizers of the first embodiment: caprolactam, alkoxylated polyethylene glycol.

Mixtures of different plasticizers provide varying degrees of plasticization and processing benefits. The range of processing conditions afforded by the present invention is increased providing a wider window of available processing conditions which may be used to achieve a desired product. For example, a mixture containing pentaerythritol may be advantageous in plasticizing polyvinyl alcohol to enable the processing window to be improved for blown film applications. Alternatively, a mixture of dipentaerythritol and triacetin may produce less volatiles during processing.

Preferred plasticizers may be selected from the group consisting of: dipentaerythritol, triacetin, methyl pentanediol, rosin esters and mixtures thereof.

An exemplary rosin ester is designated as grade 268.3.

An advantageous combination is a mixture of dipentaerythritol and triacetin, wherein the amount of dipentaerythritol is in the range of 5-15 wt % and the amount of triacetin is in the range of 5-10 wt % of the total composition. This combination has the advantage that it may lower the viscosity of the polymer for extrusion coating formulations and may also reduce the amount of volatiles produced during extrusion.

A suitable grade of dipentaerithritol is Di-Penta-93 (manufactured by Perstorp Corp.).

A suitable grade of caprolactam is caprolactam 3031 (manufactured by Ingevity).

Suitable grades of alkoxylated polyethylene glycol are Alkoxylate 4528 or Alkoxylate 3380 (manufactured by Perstorp Corp.).

In exemplary embodiments thin films of melt processed polyvinyl alcohol formulations of this invention remain clear and do not show a whitening effect after exposure to humidity. Use of an appropriate lubricant may provide films with improved visual appearance. An exemplary lubricant is euricamide. In less advantageous formulations formation of an opaque, hazy or white film after a 24-hour humidity test may indicate that phase separation has occurred.

Films containing the plasticizers of this invention may exhibit complete clarity after a 24-hour humidity test.

Further additives may be used, including antioxidants, lubricants, dyes and pigments.

A reactive stabilizer may be employed. Exemplary reactive stabilizers may be selected from the group consisting of: sodium stearate, potassium oleate, sodium benzoate, calcium stearate, stearic acid, dimethyl propionic acid and mixtures thereof.

The reactive stabilizers may be used in an amount of about 0.2 wt % to about 5 wt %, for example about 0.5 wt % to about 3 wt %, for example 0.5 wt % to about 2 wt %, for example from about 0.5 wt % to about 1.5 wt %, for example about 1 wt %.

Use of these reactive stabilizers may result in an advantageous reduction in the extent of degradation during melt processing. Sodium benzoate has been found to be particularly effective.

The processing temperature may have a maximum of about 260° C., dependent on dwell time in the higher temperature zones of the extruder.

Preferred solid plasticizers may be volatile under processing conditions at the processing temperature. Preferred plasticizers have a melting point in the range of about 150° C. to about 300° C., typically about 150° C. to about 275° C.

A solution of the plasticizer in water may be injected through a single secondary inlet.

A solid plasticizer may be fed independently or together with one or more of the polymeric materials of the formulation.

The water content of polymers of this invention may be in the range of about 0.1 wt % to about 5 wt %, for example, about 1 wt % to about 4 wt %.

In an exemplary embodiment, the mixing reactor comprises an extruder, typically a twin screw extruder. Alternatively, the mixing reactor may comprise a batch reactor for smaller scale processes. The mixing reactor should have a high internal surface area to allow efficient heat dissipation.

The extruder reactor chamber may be composed of 5-20 heated regions, typically 10-15, more preferably about 12 regions. The temperature profile may rise from ambient temperature at the first region to 200° C. adjacent the outlet. The reaction zone may have a temperature of up to 260° C.

The location of the reaction zone may be controlled by selection and adjustment of one or more of: the screw configuration, the formulation, the temperature profile, rotational speed of the one or more screws (depending on reactor type) and the rate of feed of the reaction mixture into the apparatus. The location of the reaction zone may be determined by the temperature as measured by one or more thermocouples or other temperature sensors located arranged along the length of the chamber. In a preferred embodiment, the reaction zone is controlled so that it is located prior to the secondary outlet, upstream of the primary outlet. The location of the reaction zone may be adjusted so that the reaction is complete prior to venting.

Energy provided by the application of shear forces and control of the temperature of the polymer mixture allows control of the chemical energetics of the exothermic reaction between the processing aid and the hydrogen bonded crystalline domains of the polymer following commencement of the exothermic reaction. Failure to affect adequate temperature control may lead to decompositionand even carbonisation of the polymer mixture.

In a preferred embodiment, the configuration of the screws, typically co-rotating closely intermeshing twin screws of a twin screw extruder, may be as follows.

A conveying section may be provided at the throat or inlet of the extruder. The feed rate should be regulated so that the throat is not overfed. The conveying section is followed by an intensive mixing zone, followed in turn by a conveying section which forms the reaction zone. In the reaction zone, the reaction goes essentially to completion. This is followed by an intensive mixing section in which the reaction is driven fully to completion. Following the intensive mixing section, there is a low pressure zone where venting is allowed. A compression zone then feeds the mixture to a dye, pump or simple screw extruder. A typical screw configuration which may be used is shown in FIG. 1:

In an embodiment having 12 temperature zones, the zones may have the following set temperatures depending on the formulation to be processed.

The temperatures which may be used for a blown film formulation are as follows:

| Zone | 0 | 1 | 2 | 3 | 4 | 5 | 6 | 7 | 8 | 9 | 10 | 11 | 12 |
|---|---|---|---|---|---|---|---|---|---|---|---|---|---|
| Temp. (° C.) | x | 20 | 22 | 75 | 155 | 195 | 200 | 200 | 200 | 200 | 200 | 200 | 200 |

The temperatures which may be used for an extrusion coating formulation are as follows:

| Zone | 0 | 1 | 2 | 3 | 4 | 5 | 6 | 7 | 8 | 9 | 10 | 11 | Die |
|---|---|---|---|---|---|---|---|---|---|---|---|---|---|
| Temp. (° C.) | x | 10 | 10 | 75 | 200 | 235 | 250 | 250 | 250 | 230 | 230 | 225 | 225 |

The temperature of the reaction mixture may not be the same as the set point values because of mechanical heating stemming from the mixing process, shear heating effects and the reaction exotherm and the poor heat transfer to coolant in a steel reaction vessel. Those skilled in the art are capable of judging the appropriate processing conditions.

An intensive mixing region may be provided downstream of the reaction zone to ensure completion of the reaction of the processing aid and polymer. In a preferred embodiment, the intensive mixing region may comprise a paddle mixer located between the reaction zone and the secondary outlet. The mixing region may be a kneading region comprising pairs of inter-engaging rotor blades or paddles.

Preferred mixing reactors are self-cleaning in use. Co-rotating intermeshing screws as used in twin screw extruders may be employed. The stated operating conditions may be employed using appropriate start-up and shut-down procedures.

For start-up, a completely empty and clean extruder barrel may be used. The water or processing aid feed is started followed by the polymer powder and plasticizer either simultaneously or successively. The initial feed rate and screw rotation are lower than the steady state speeds. In the case where the die is connected directly to the twin screw extruder, once a coherent strand is produced the feed rate and screw speeds are raised to the steady state conditions. The fitting of a dry face cutter or strand pelletiser is carried out in the usual way known to those skilled in the art. When a single screw is employed, this must be empty and connected to the twin screw extruder prior to start-up.

Pre-flushing with standard flushing agents such as low density polyethylene, high density polyethylene or polypropylene, whether filled or unfilled, is neither necessary nor desirable when using the process of the present invention. When the die is attached to the single screw extruder pelletiser filling is as described above.

In order to provide a clean extruder for a subsequent start-up, the shut-down procedure may involve stripping all feeds and reducing all screw speeds and continued running until as much material as possible has been delivered. Where the twin screw extruder is coupled to a single screw extruder or other form of melt pump, the twin screw may be decoupled from the single screw and the die may also be uncoupled. The die is placed in a heated oven at 300-450° C. to burn off any remaining polymer or soaked in hot water until the polymer dissolves or becomes swollen so that it can be readily removed mechanically. The temperature of the decoupled twin screw extruder may be then lowered to a uniform 100-110° C. with rotation of the screws so that the residual polymer is ejected as crumb-like material until the barrels are empty. The barrel may be then polished by feeding some of the dried powdered polymer. After the polishing stage, the final residual material is ejected.

In the case of a single screw extruder, the optimal processing temperature of about 200° C. is maintained. If a closed barrel extruder is used, the screws may be decoupled and removed slowly without cooling. The polymer is pulled from the screws as it is withdrawn from the barrel. This affords a clean screw. If a clam-shell single screw extruder is used, the casing may be opened and the polymer removed quickly while hot before removing the heated screws. The barrel may be cleaned with a wire brush during cooling. Flushing the extruder barrels with a purged material is neither necessary nor effective.

The secondary outlet may be a vent permitting volatile processing aids, for example steam, to be completely or partially removed from the polymer mixture.

When water is the processing aid, the water content of the plasticised plasticized polymer may be less than 5 wt %, preferably less than 2 wt %, more preferably not more than 0.5 wt %.

In an alternative embodiment, an inlet for the processing aid is located upstream of the inlet for the plasticizer. This allows the polymer to mix with the processing aid before the plasticizer is introduced. Without wishing to be bound by theory it is believed that the molecules of a plasticizer such as neopentyl glycol may be slow to break into the crystalline domains of the polyvinyl alcohol. Energy provided by the application of shear forces to and control of the temperature of the polymer mixture allows control of the chemical energetics of the exothermic reaction between the processing aid and the hydrogen bonded crystalline domains of the polymer following commencement of the exothermic reaction. Failure to effect adequate control may lead to degradation and even carbonization of the polymer.

The rate of rotation of the twin screws may be regulated to control the specific energy per unit length of the reactive mixing chamber so that the screws serve as energy input devices.

In a typical embodiment, the chamber of the mixing reactor may be 30%-70% filled with the polymer mixture with the remaining volume being empty or serving as a lower pressure zone to facilitate devolatilization. Consequently, the rate of output of polymer from the primary outlet may not be consistent and may be pulsed. A compaction zone may be employed to provide a continuous output.

In a preferred embodiment, the mixing reactor is a twin screw extruder having a preferred length to diameter ratio in the range 25:1 to 50:1, preferably about 25:1 to 45:1, more preferably about 40:1. For example a typical mixer reactor may have two 95 mm diameter screws with a length of 4.8 meters.

The primary outlet may comprise a die, for example a multistrand die.

Alternatively, in an advantageous embodiment of the invention, a pump may be provided downstream of the primary outlet. The pump may comprise a single screw extruder unit. The configuration and speed of rotation of the single screw may be selected so that the pump is full of plasticized polymer during use. In this way the screw serves as a variable pump which is controllable to provide a constant flow of polymer to a die located downstream of the reactive mixer.

Application of shear by mixing a temperature controlled mixture of polyvinyl alcohol and water, or other processing aid, gives rise to an exothermic reaction which when properly controlled serves to reduce or destroy crystallinity of the high degree of hydrolysis polyvinyl alcohol. Without wishing to be bound by theory, it is believed that lattice energy of the crystalline polyvinyl alcohol is released by the introduction of hydrogen bonding due to incorporation of water, or other processing aid, into the polymer mixture.

The onset of the exothermic reaction may be controlled by selection of the temperature profile and shear rate applied in the twin screws. The extent of the exothermic reaction may be controlled by the rate of heat removal from the mixer, by the composition and feed rate of the reaction mixture, and by regulation of the shear energy input and location of the reaction zone. The location of the reaction zone at which the exothermic reaction occurs may be controlled by appropriate control of the temperature profile and rate of rotation.

The boiling point of the processing aid is preferably selected so that it is less than the temperature of the reaction and mixing zones, permitting venting of excess processing aid from the polymer mixture.

The mean residence time in the mixer may be about 2-10 minutes, preferably about 5 minutes. The residence time in the reactor is preferably sufficient to allow completion of the reaction so that a viscoelastic melt is obtained with a minimum amount of unreacted polyvinyl alcohol.

A cooling chamber may be located downstream of the die. This may comprise a system of moving rollers located in a controlled atmosphere arranged so that the polymer strands emerging from the die are maintained under appropriate tension as they cool and solidify prior to pelletization.

According to a second aspect of the present invention there is provided a homopolymer polyvinyl alcohol composition comprising:
a polyvinyl alcohol homopolymer or blend thereof having a degree of hydrolysis in the range from 93 wt % to 98 wt %;
a plasticizer in a range from 2 wt % to 15 wt %,
wherein the plasticizer is selected from a group consisting of: the following compounds and mixtures thereof:
  (a) sugar alcohols selected from the group consisting of: diglycerol, triglycerol, fructose, ribose, xylose, D-mannitol, triacetin, and mixtures thereof;
  polyols selected from the group consisting of: pentaerythritol, dipentaerythritol, and mixtures thereof;
  (b) diols selected from the group consisting of: methyl pentanediol, 1,2-propanediol, 1,4-butanediol, 2-hydroxy-1,3-propanediol, 3-methyl-1,3-butanediol, 3,3-dimethyl-1,2-butanediol, and mixtures thereof;
  (c) glycols selected from the group consisting of: polyethylene glycol 300, polyethylene glycol 400, alkoxylated polyethylene glycol, and mixtures thereof;
  (d) caprolactam, tricyclic trimethylolpropane formal, rosin esters, euricamide, and mixtures thereof; and wherein in the polymer is a viscoelastic thermoplastic material.

According to a third aspect of the present invention a method of reducing degradation of homopolymeric polyvinyl alcohol during processing includes the steps of the method of the first aspect of this invention.

The polyvinyl alcohol composition of this invention provides many advantages in relation to previously used compositions. Exemplary embodiments are extrudable and can be used for making pellets, films and fibres.

The percentages referred to in this specification may be selected from any of the ranges quoted to total 100%. Percentages or other quantities used in the specification are by weight unless indicated otherwise.

The invention is further described by means of example but not in any limitative sense.

EXAMPLES

Example 1: Properties of Plasticizer

The experimental results shown below illustrate properties of homopolymer polyvinyl alcohols according to this invention using various plasticizers and plasticizer combinations. The results show that the disclosed combinations provide greater stability and processability of the polymers in comparison to the traditionally used plasticizer such as glycerol. The use of these combinations has increased the range of processing conditions available for manufacture of specific polyvinyl alcohol products.

The procedure was as follows:—
50 g samples were added to a batch mixer at a specific temperature and specific mixing speed. Torque was monitored. Several combinations of plasticizer were employed. The results are set out in the following Table:

| Plasticizer Combination | Temp | Max Torque (Nm) | Torque Levelled Value (Nm) |
|---|---|---|---|
| Capa: 5.00% MPD: 5.00% | 210° C. | 19.8 @ 9 s | 4.1 |
| Capa: 5.00% MPD: 5.00% TMP: 5.00% | 210° C. | 5.4 @ 14 s | 2.5 |
| Capa: 5.00% MPD: 5.00% RE1: 5.00% | 210° C. | 7.9 @ 1:15 min | 3.1 |
| Capa: 5.00% MPD: 5.00% RE1LO: 5.00% | 210° C. | 7.9 @ 1:23 min | 3.3 |
| Capa: 5.00% MPD: 5.00% PEG 400: 5.00% | 210° C. | 18.8 @ 9 s | 3.1 |
| Capa: 5.00% MPD: 5.00% Di-penta: 5.00% | 210° C. | 18.3 @ 15 s | 3.0 |
| Capa: 5.00% MPD: 5.00% TA: 5.00% | 210° C. | 21.7 @ 8 s | 3.3 |
| TA: 10.00% MPD: 5.00% | 210° C. | 19.9 @ 14 s | 3.7 |
| RE1LO: 10.00% TA: 5.00% | 210° C. | 5.0 @ 7 s | 0.0 |
| TA: 5.00% RE1: 5.00% | 210° C. | 6.1 @ 9 s | 4.6 |
| TA: 10.00% RE1: 5.00% | 210° C. | 8.3 @ 17 s | 0.0 |
| DP: 14.37% TA: 4.29% | 210° C. | 14.0 @ 8 s | 2.4 |
| TA: 14.37% MPD: 4.29% | 210° C. | 20.7 @ 5 s | 4.1 |
| Penta: 14.37% TA: 4.29% | 210° C. | 5.6 @ 20 s | 1.8 |
| Penta: 11.55% TA: 3.45% | 210° C. | 7.9 @ 12 s | 2.4 |
| Penta: 7.70% TA: 2.30% | 210° C. | 14.0 @ 10 s | 3.4 |
| Penta: 5.78% TA: 1.73% | 210° C. | 19.6 @ 13 s | 4.0 |
| Penta: 3.85% TA: 1.15% | 210° C. | 23.1 @ 12 s | 4.6 |
| MPD: 5.00% Polyol 4525: 5.00% | 210° C. | 23.0 @ 12 s | 4.6 |
| MPD: 5.00% Polyol 3380: 5.00% | 210° C. | 27.5 @ 10 s | 3.9 |
| TA: 9.33% Polyol 3380 9.33% | 210° C. | 22.2 @ 16 s | 3.5 |
| TA: 5.00% Polyol 3380: 5.00% | 210° C. | 25.5 @ 38 s | 4.0 |
| Penta: 10.00% MPD: 5.00% | 210° C. | 7.7 @ 11 s | 2.2 |
| Di penta: 10.00% MPD: 5.00% | 210° C. | 14.4 @ 9 s | 2.6 |
| Polyol 4525: 5.00% MPD: 5.00% PEG 400: 5.00% | 210° C. | 17.4 @ 10 s | 3.8 |
| Polyol 3380: 5.00% MPD: 5.00% PEG 400: 5.00% | 210° C. | 19.3 @ 9 s | 3.3 |

Key:
Capa = caprolactam
MPD = methyl pentanediol
TMP = trimethylol propane
RE1 = resin ester (modified)
RE1LO = rosin ester (lower hydroxyl)
PEG 400 = polyethylene glycol 400
Di penta = dipentaerythritol
TA = triacetin
Penta = pentaerythritol Plasticizer combinations with a lower torque provide a polymer with improved processability and stability.

Preferred combinations are:—
Capa: 5.00%, MPD: 5.00%, RE1: 5.00%
DP: 14.37%, TA: 4.29%
Penta: 10.00%, MPD: 5.00%

Example 2—Loss of Volatiles

The loss of volatiles during processing was measured. The results are illustrated in the following Table:—

| Plasticizer | % weight loss 5 mins | % weight loss 10 mins | % weight loss 15 mins | % weight loss 30 mins | % weight loss 60 mins |
|---|---|---|---|---|---|
| TMP | 1.69 | 2.86 | 3.90 | 6.58 | 10.82 |
| Triacetin/MPD | 1.11 | 1.98 | 2.74 | 4.66 | 7.43 |
| Di penta/Triacetin | 0.90 | 1.28 | 1.51 | 1.93 | 2.51 |
| Di Penta/Triacetin/MPD | 0.84 | 1.3 | 1.8 | 2.9 | 4.9 |
| Polyol 3880/Triacetin | 0.32 | 0.60 | 0.87 | 1.67 | 3.19 |
| Triacetin/MPD | 1.48 | 2.45 | 3.15 | 4.52 | 9.39 |
| Triacetin/MPD/Capa | 1.11 | 1.98 | 2.74 | 4.66 | 7.42 |
| Rosin ester/MPD/Capa | 0.55 | 0.96 | 1.35 | 2.39 | 4.13 |
| MPD/Capa/PEG 400 | 0.76 | 1.36 | 1.92 | 3.51 | 6.40 |

Key:
See Example 1

The results show that the stability of the polymer is improved when using the plasticizer combinations of this invention. Particularly advantageous combinations include rosin ester, MPD and Capa; and also Polyol 3880 with triacetin. These show a decreased weight loss in the region of <5%.

Example 3: Differential Scanning Calorimetry (DSC)

DSC parameters used to scan the polymers were as follows:—
(1) Heat from 0° C. to 250° C. at a heating rate of 10° C./min
(2) Cool from 0° C. to 250° C. at a rate of 10° C./min
(3) Heat from 0° C. to 250° C. at a rate of 10° C./min The results are shown in the following Table:

| Plasticizer | Tg ° C. | Tm ° C. (peak) |
|---|---|---|
| Polyol 3990/Penta | 57 | 208 |
| TMP/Penta | 47 | 211 |
| D-Mannitol | 49 | 211 |
| MPD/Dipenta | 59 | 213 |
| Capa/TA | 55 | 165 |
| TA/MPD/Di penta | 62 | 180 |
| Rosin Ester/MPD/Capa | 63 | 183 |
| TA/Polyol 3380 | 59 | 170 |
| Capa/MPD/PEG 400 | 57 | 183 |

Key:
See Example 1

Example 4: Capillary Rheometry Data

Figure 2:
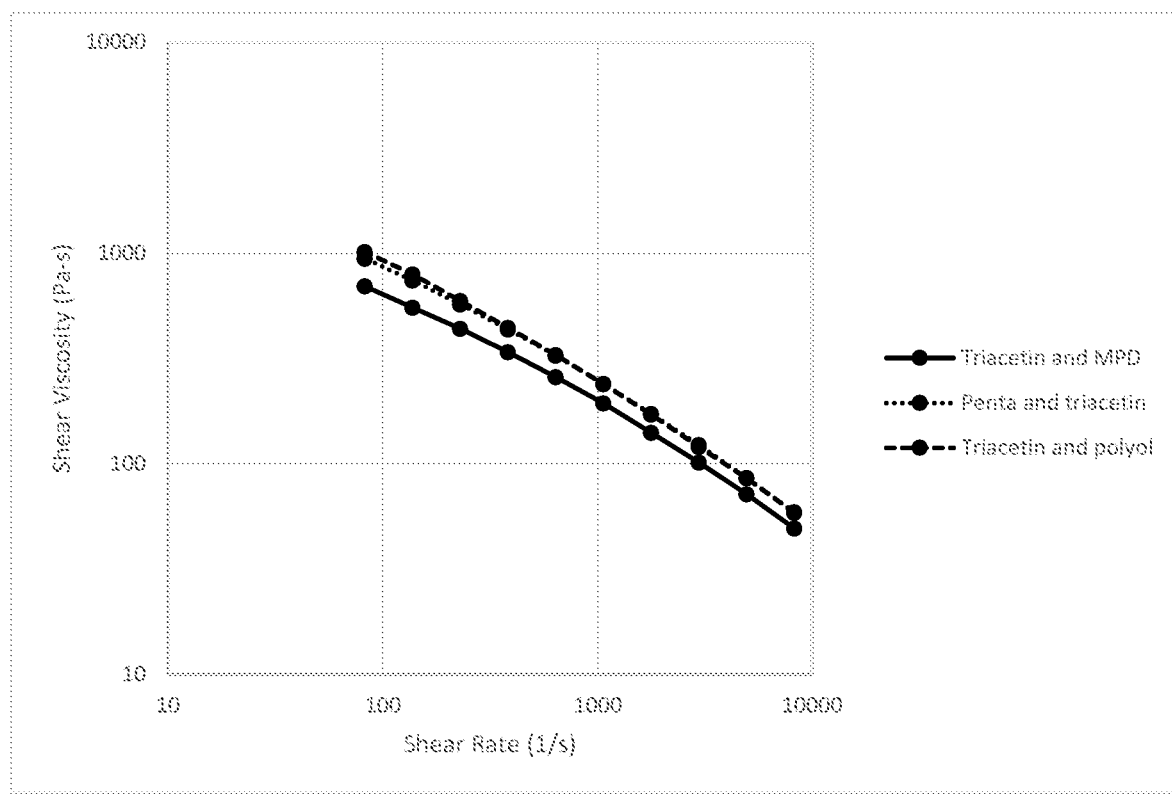
FIG. 2 illustrates the shear rate of triacetin and MPD, penta and triacetin and triacetin and polyol.
Figure 3:
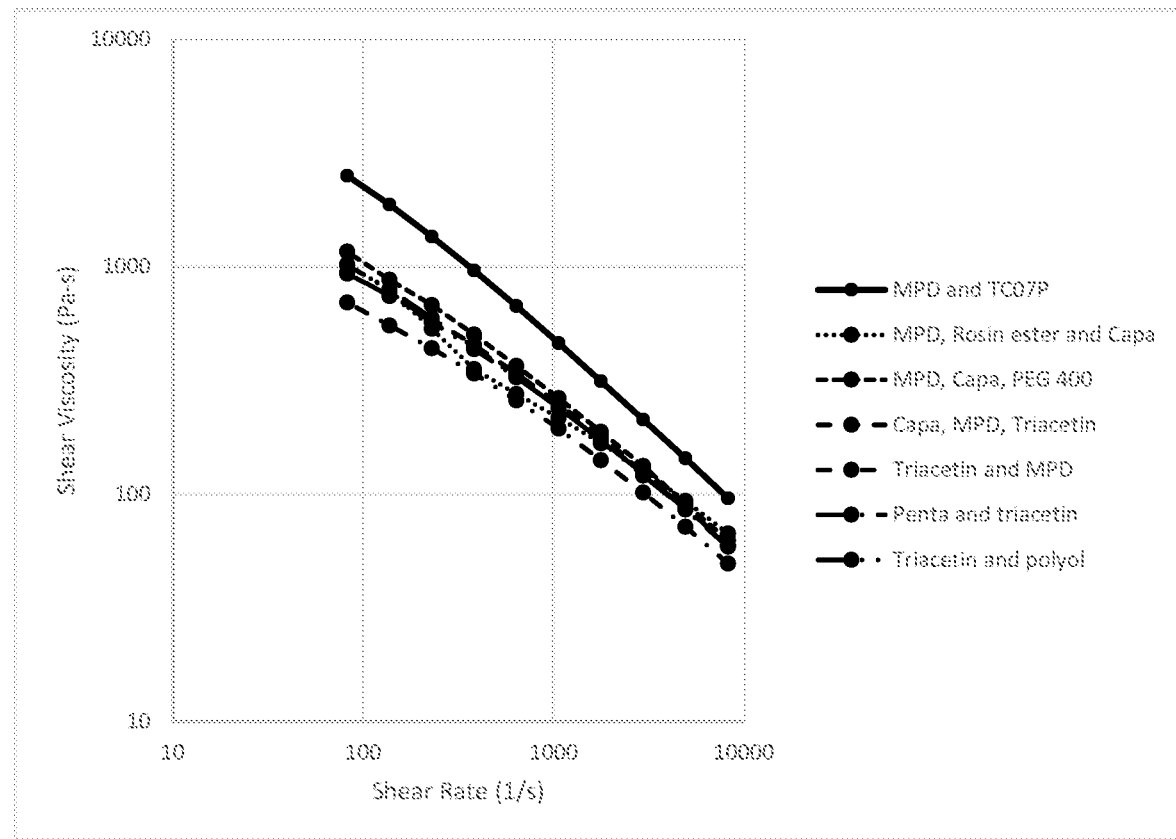
FIG. 3 illustrates the shear rate of MPD and TCO7P, MPD, rosin esters and Capa, MPD, Capa and PEG 400, Capa, MPD and triacetin, triacetin and MPD, Penta and triacetin, and triacetin and polyol.

The method used for the capillary rheometer was a shear sweep test with shear rates ranging from 8245.87 to 82.46 l/s. This method was used to test a range of viscosities and both high and low shear rates. The test was performed at 200° C. with a melt time of five minutes in order to give a sufficiently molten polymer with limited degradation for the test. The conditions were altered depending on the grades/viscosities required. For lower viscosity grades the test was performed at 220° C. and for higher viscosity grades at 230° C. The results are shown in FIGS. 1-3.

Example 5: Quality of Polymers on an Extrusion Coating Line

The following Table illustrates the quality of polymers using various on an extrusion line.

Example 6: Properties of Plasticized Blends

The polyvinyl alcohol used consisted of a blend of two polyvinyl alcohol polymers

| Plasticiser combination | Nibs | Gels | Holes | Curtain | Coating | Adhesion 30µ | Adhesion 20-25µ | Adhesion 15-20µ |
|---|---|---|---|---|---|---|---|---|
| Capa, MPD, and PEG 400 | No | No | No | Good | Good | Poor | Poor | Poor |
| Di penta, Glycerol | No | No | Yes | Good | Poor | Poor | Poor | Poor |
| Di penta, MPD | No | No | No | Good | Good | Poor | Poor | Poor |
| MPD | No | No | No | Good | Good | Poor | Poor | Poor |
| Rosin Ester, MPD | No | No | Few | Good | Good | Poor | Poor | Poor |
| Rosin Ester, MPD and Capa | No | No | Few | Good | Good | Poor | Poor | Poor |
| MPD, Capa | No | No | Few | Good | Good | Poor | Poor | Poor |
| Dipenta, TA | No | Yes | Yes | Good | Good | Good | Good | Good |
| Penta, TA | No | No | Few | Good | Good | Good | Good | Good |
| Dipenta, MPD and Capa | No | No | No | Good | Good | Good | Good | OK |
| TA, MPD and Capa | Yes | No | No | Good | Good | Good | Good | OK | each having a degree of hydrolysis of 93% to 98%, one with a high molecular weight and one with a low molecular weight polyvinyl alcohol. The ratio of the polyvinyl alcohols used was 75% high molecular weight polyvinyl alcohol to 25% low molecular weight polyvinyl alcohol. One or more plasticizers were used comprising 12 wt % and one or more processing aids comprising 11 wt % of the polymer composition. This formulation had a high viscosity that was suitable for blown film applications.

Example 7: Rheology

The polyvinyl alcohol used consisted of a blend of two polyvinyl alcohol polymers each having a degree of hydrolysis of 80% to 98%, one with a high molecular weight and one with a low molecular weight polyvinyl alcohol. The ratio of the polyvinyl alcohol in the polymer was 50 wt % high molecular weight polyvinyl alcohol and 50 wt % low molecular weight polyvinyl alcohol. One or more plasticizers were used comprising 20 wt % of the polymer composition and one or more processing aids in an amount of 10 wt % of the polymer. The formulation had a low viscosity that was suitable for extrusion coating application.

Analytical data showed the differences in the two formulations.

The results showed that by changing the polyvinyl alcohol combinations the rheology/viscosity of the polymer can be controlled. The extrusion coating formulation has a lower viscosity than the blown film formulation.

DSC data showed the difference in crystallization temperatures and melting peaks of the two formulations. The extrusion coating recrystallized at a temperature of 140° C. whereas the blown film recrystallized at a higher temperature of 180° C. This can be advantageous for certain applications where the polymer is desired to stay molten for a longer time. The melting temperature of the polymers was changed with the extrusion coating melting at 195° C. and the blown film melting at 215° C.

Thermogravimetric analysis (TGA) showed that the lower hydrolysis polyvinyl alcohol combinations (extrusion coating) were more susceptible to degradation than the polymers with a higher degree of hydrolysis. Both combinations had a degradation temperature of approximately 300° C., but the higher degree of hydrolysis combination degraded over a much shorter temperature range than the lower degree of hydrolysis combination.

What is claimed is:

1. A method for manufacture of a plasticized polyvinyl alcohol polymer mixture, the method comprising the steps of:
   introducing into a mixing reactor a polyvinyl alcohol polymer comprising homopolymeric polyvinyl alcohol or a blend thereof having a degree of hydrolysis in the range of 93% to less than 98%;
   wherein the mixing reactor comprises a blending chamber having a primary inlet, a primary outlet and at least two inter-engaging components extending between the primary inlet and the primary outlet, the at least two inter-engaging components being arranged to apply a shearing force to the polyvinyl alcohol polymer while the polyvinyl alcohol polymer is conveyed by the at least two inter-engaging components from the primary inlet through a reaction zone to the primary outlet;
   one or more secondary inlets located downstream from the primary inlet for introducing reactants comprising water as a processing aid and a plasticizer to the blending chamber to form a reaction mixture;
   wherein the plasticizer comprises triacetin, and dipentaerythritol;
   wherein the blending chamber comprises a plurality of heated regions arranged so that the reaction mixture is subjected to a temperature profile whereby the temperature increases from the primary inlet to the primary outlet;
   a secondary outlet located between the reaction zone and the primary outlet arranged to allow removal of water from the blending chamber;
   reacting the water, the plasticizer and the polyvinyl alcohol polymer in the reaction zone to form the plasticized polyvinyl alcohol polymer mixture; and
   allowing the plasticized polyvinyl alcohol polymer mixture to pass from the primary outlet.

2. The method as claimed in claim 1 wherein the polyvinyl alcohol polymer has a degree of hydrolysis of 93 wt % to 97 wt %.

3. The method as claimed in claim 2 wherein the polyvinyl alcohol polymer has a degree of hydrolysis of 93 wt % to 95 wt %.

4. The method as claimed in claim 1, wherein the polyvinyl alcohol polymer comprises a lower viscosity polymer and a higher viscosity polymer, wherein both polymers have the same degree of hydrolysis.

5. The method as claimed in claim 1 wherein the reactants further comprise a reactive stabilizer selected from the group consisting of:
   sodium stearate, potassium oleate, sodium benzoate, calcium stearate, stearic acid, dimethyl propionic acid and mixtures thereof.

6. The method as claimed in claim 5, wherein the amount of the reactive stabilizer is from 0.2 wt % to 5 wt %.

7. The method as claimed in claim 6, wherein the amount of the reactive stabilizer is from 0.5 wt % to 3 wt %.

8. The method as claimed in claim 7, wherein the amount of the reactive stabilizer is from 0.5 wt % to 2 wt %.

9. The method as claimed in claim 8, wherein the amount of the reactive stabilizer is from 0.5 wt % to 1.5 wt %.

10. The method as claimed in claim 9, wherein the amount of the reactive stabilizer is 1 wt %.

11. The method as claimed in claim 1 wherein the plasticizer further comprises a compound selected from: diglycerol, triglycerol, xylose, triacetin, D-mannitol, 1,4-butanediol, 3,3-dimethyl-1,2-butanediol and caprolactam.

12. The method as claimed in claim 1, wherein the amount of each plasticizer compound is from 2 wt % to 15 wt %.

13. The method as claimed in claim 1, wherein the total amount of the plasticizers is from 15 wt % to 30 wt %.

14. The method as claimed in claim 1, wherein the water content of the plasticized polyvinyl alcohol polymer mixture is in the range 0.1 wt % to 5 wt %.

* * * * *